(12) United States Patent
Drysdale et al.

(10) Patent No.: US 8,697,831 B2
(45) Date of Patent: Apr. 15, 2014

(54) PROCESS FOR PREPARING POLYAMIDES COMPRISING FLUOROETHER FUNCTIONALIZED AROMATIC MOIETIES

(75) Inventors: Neville Everton Drysdale, Newark, DE (US); David Neil Marks, Newark, DE (US); Fredrik Nederberg, Greenville, DE (US)

(73) Assignee: E I du Pont de Nemours and Company, Wilmington, DE (US)

( * ) Notice: Subject to any disclaimer, the term of this patent is extended or adjusted under 35 U.S.C. 154(b) by 106 days.

(21) Appl. No.: 13/166,052

(22) Filed: Jun. 22, 2011

(65) Prior Publication Data

US 2012/0329976 A1 Dec. 27, 2012

(51) Int. Cl.
| | |
|---|---|
| *C08G 69/28* | (2006.01) |
| *C08G 69/04* | (2006.01) |
| *C08G 69/16* | (2006.01) |
| *C07C 69/86* | (2006.01) |
| *C07C 69/92* | (2006.01) |

(52) U.S. Cl.
USPC ........... 528/183; 528/208; 528/324; 528/339; 528/347

(58) Field of Classification Search
USPC .......................... 528/324, 347, 183, 208, 339
See application file for complete search history.

(56) References Cited

U.S. PATENT DOCUMENTS

| | | | | |
|---|---|---|---|---|
| 5,962,628 | A | * 10/1999 | Keske | 528/310 |
| 6,130,312 | A | * 10/2000 | Murakami et al. | 528/339 |
| 2011/0218319 | A1 | * 9/2011 | Drysdale et al. | 528/339 |
| 2011/0218353 | A1 | * 9/2011 | Drysdale et al. | 560/60 |

FOREIGN PATENT DOCUMENTS

CA 2772872 * 3/2011

OTHER PUBLICATIONS

Related U.S. Appl. No. 13/166,006, Neville Everton Drysdale, filed Jun. 22, 2011.
Related U.S. Appl. No. 13/166,069, Neville Everton Drysdale, filed Jun. 22, 2011.

* cited by examiner

*Primary Examiner* — Fred M Teskin

(57) ABSTRACT

The invention is directed to a process for preparing polyamide polymers, particularly nylon 6, 6 and nylon 6, comprising fluoroether functionalized aromatic repeat units. In one embodiment, 1,6 diaminohexane, adipic acid, and fluoroether functionalized terephthallic or isophthallic acid or diester are reacted to form a polymer. The polymers so formed are useful for imparting soil resistance to polyamides, particularly in the form of films, molded parts, fibers, fabrics, and carpets.

16 Claims, 1 Drawing Sheet

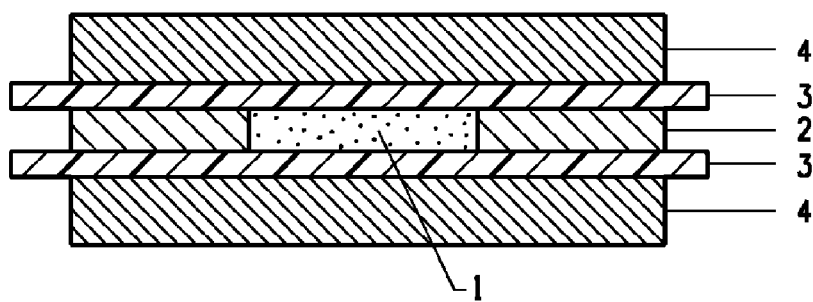

PROCESS FOR PREPARING POLYAMIDES COMPRISING FLUOROETHER FUNCTIONALIZED AROMATIC MOIETIES

RELATED PATENT APPLICATIONS

This patent application is related to U.S. patent application Ser. Nos. 13/166006 and 13/166069, both filed on Jun. 22 2011.

FIELD OF THE INVENTION

The invention is directed to a process for preparing polyamide polymers, particularly nylon 6, 6 and nylon 6, comprising fluoroether functionalized aromatic repeat units.

BACKGROUND

Fluorinated materials have many uses. In particular, they are used in polymer-related industries, and, more particularly, in fiber-related industries, to impart soil and oil resistance. Generally, these materials are applied as a topical treatment, but their effectiveness decreases over time due to material loss via wear and washing.

There is a need to provide polymeric materials that have improved soil and oil resistance.

SUMMARY OF THE INVENTION

In one aspect, the invention provides a polymer comprising a fluoroether functionalized aromatic repeat unit represented by the structure (I)

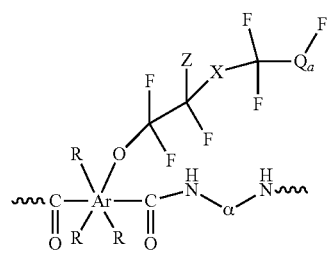

wherein,
α is a C4-C12 linear alkylene diradical which can be branched or unbranched wherein one or more carbons can be replaced by ether oxygen, or a cyclic alkylene diradical wherein one or more carbons can be replaced by ether oxygen;
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

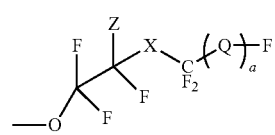

with the proviso that only one R can be OH or the radical represented by the structure (II);
wherein one or more carbons can be replaced by ether oxygen;
X is O or $CF_2$;
Z is H, Cl, or Br;
a=0 or 1;
and,
Q represents the structure (Ia)

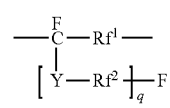

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In another aspect, the present invention provides a process, comprising combining in a pressure vessel a fluoroether functionalized aromatic diester or diacid with a $C_4$-$C_{12}$ diamine, branched or unbranched, to form a reaction mixture; sealing said pressure vessel, and heating said reaction mixture in an oxygen reduced atmosphere to a temperature of 225 to 275° C. under autogenous pressure; wherein the fluoroether functionalized aromatic diester or diacid is represented by the structure (III),

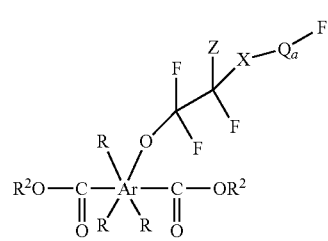

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

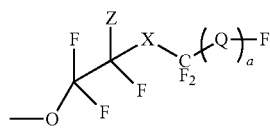

with the proviso that only one R can be OH or the radical represented by the structure (II);
$R^2$ is H or $C_1$-$C_{10}$ alkyl;
X is O or $CF_2$;
Z is H, Cl, or Br;
a=0 or 1;
and, Q represents the structure (Ia)

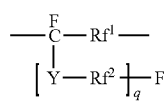

wherein q=0-10;

Y is O or $CF_2$;

$Rf^1$ is $(CF_2)_n$, wherein n is 0-10;

and, $Rf^2$ is $(CF_2)_p$, wherein p is 0-10, with the proviso that when p is 0, Y is $CF_2$; and, wherein the diamine comprises a $C_4$-$C_{12}$ linear alkylene diradical which can be branched or unbranched wherein one or more carbons can be replaced by ether oxygen, or a cyclic alkylene diradical wherein one or more carbons can be replaced by ether oxygen;

In a further aspect, the present invention provides a shaped article comprising a polymer comprising a fluoroether functionalized aromatic repeat unit represented by the structure (I)

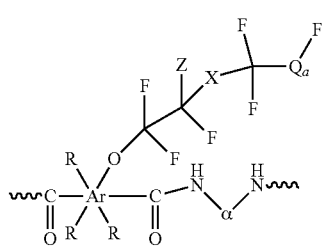

wherein, wherein α is a C4-C12 linear alkylene diradical which can be branched or unbranched wherein one or more carbons can be replaced by ether oxygen, or a cyclic alkylene diradical wherein one or more carbons can be replaced by ether oxygen;

Ar represents a benzene or naphthalene radical;

each R is independently H, $C_1$-$C_{10}$ alkyl, $C_5$-$C_{15}$ aryl, $C_6$-$C_{20}$ arylalkyl; OH, or a radical represented by the structure (II)

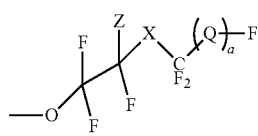

with the proviso that only one R can be OH or the radical represented by the structure (II);

wherein one or more carbons can be replaced by ether oxygen;

X is O or $CF_2$;

Z is H, Cl, or Br;

a=0 or 1;

and,

Q represents the structure (Ia)

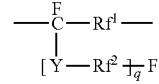

wherein q=0-10;

Y is O or $CF_2$;

$Rf^1$ is $(CF_2)_n$, wherein n is 0-10;

and, $Rf^2$ is $(CF_2)_p$, wherein p is 0-10, with the proviso that when p is 0, Y is $CF_2$.

BRIEF DESCRIPTION OF THE DRAWING

The drawing depicts the sample preparation configuration as described in the examples, viewed in cross-section.

DETAILED DESCRIPTION

When a range of values is provided herein, it is intended to encompass the end-points of the range unless specifically stated otherwise. Numerical values used herein have the precision of the number of significant figures provided, following the standard protocol in chemistry for significant figures as outlined in ASTM E29-08 Section 6. For example, the number 40 encompasses a range from 35.0 to 44.9, whereas the number 40.0 encompasses a range from 39.50 to 40.49.

The parameters n,p, and q as employed herein are each independently integers in the range of 1-10.

As used herein, the term "fluoroether functionalized aromatic diester" refers to that subclass of compounds of structure (III) wherein $R^2$ is $C_1$-$C_{10}$ alkyl. The term "fluoroether functionalized aromatic diacid" refers to that subclass of compounds of structure (III) wherein $R^2$ is H. The term "perfluorovinyl compound" refers to the olefinically unsaturated compound represented by structure (VII), infra.

As used herein, the term "copolymer" refers to a polymer comprising two or more chemically distinct repeat units, including dipolymers, terpolymers, tetrapolymers and the like. The term "homopolymer" refers to a polymer consisting of a plurality of repeat units that are chemically indistinguishable from one another.

In any chemical structure herein, when a terminal bond is shown as "—", where no terminal chemical group is indicated, the terminal bond "—" indicates a radical. For example, —$CH_3$ represents a methyl radical.

In one aspect, the present invention provides a polymer comprising a fluoroether functionalized aromatic repeat unit represented by the structure (I).

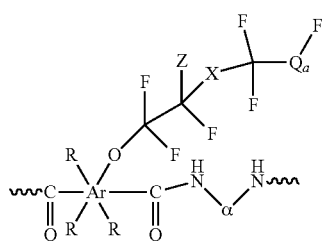

wherein,
α is a C4-C12 linear alkylene diradical which can be branched or unbranched wherein one or more carbons can be replaced by ether oxygen, or a cyclic alkylene diradical wherein one or more carbons can be replaced by ether oxygen;
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

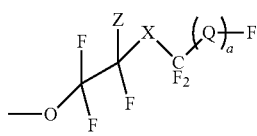

II with the proviso that only one R can be OH or the radical represented by the structure (II);
wherein one or more carbons can be replaced by ether oxygen;
X is O or $CF_2$;
Z is H, Cl, or Br;
a=0 or 1;
and,
Q represents the structure (Ia)

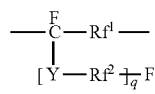

Ia wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

As can be noted in the formulas above that show substituents attached to aromatic rings "Ar", the substituents can be attached to the aromatic rings at any point, thus making it possible to have ortho-, meta- and para-substituents as defined above.

In one embodiment of the polymer, one R is OH.
In one embodiment of the polymer, each R is H.
In one embodiment of the polymer, one R is OH and the remaining two Rs are each H.
In one embodiment of the polymer, one R is represented by the structure (II) and the remaining two Rs are each H.
In one embodiment of the polymer, α is a $C_4$-$C_{12}$ linear alkylene diradical which can be branched or unbranched.
In one embodiment of the polymer, α is an unbranched hexamethylene diradical.
In one embodiment of the polymer, X is O. In an alternative embodiment, X is $CF_2$.
In one embodiment of the polymer, Y is O. In an alternative embodiment, Y is $CF_2$.
In one embodiment of the polymer Z is Cl or Br. In a further embodiment, Z is Cl. In an alternative embodiment, one R is represented by the structure (II), and one Z is H. In a further embodiment, one R is represented by the structure (II), one Z is H, and one Z is Cl.
In one embodiment of the polymer, $Rf^1$ is $CF_2$.
In one embodiment of the polymer, $Rf^2$ is $CF_2$.
In one embodiment of the polymer, $Rf^2$ is a bond (that is, p=0), and Y is $CF_2$.
In one embodiment, a=0.

In one embodiment, a=1, q=0, and n=0.
In one embodiment of the polymer, a=1, each R is H, Z is Cl, α is unbranched hexamethylene, X is O, Y is O, $Rf^1$ is $CF_2$, and $Rf^2$ is perfluoropropenyl, and q=1.
In one embodiment of the polymer, the polymer is a homopolymer.
In one embodiment, the polymer is a copolymer made up of repeat units that are different embodiments of structure (I); that is, different repeat units that are still represented by embodiments of structure (I). The copolymer can thus contain repeat units of structure (I) that are the same or different.

In one embodiment the specific repeat unit represented by structure (I) is represented by the structure (IVa)

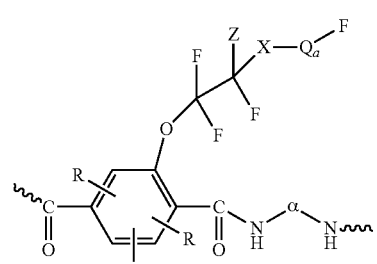

IVa wherein R, α, Z, X, Q, and a are as stated supra.

In one embodiment the specific repeat unit represented by structure (I) is represented by the structure (IVb)

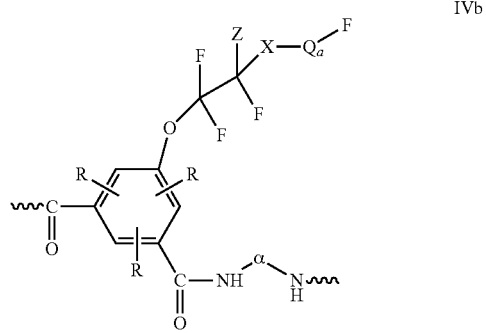

IVb wherein
α is a C4-C12 linear alkylene diradical which can be branched or unbranched wherein one or more carbons can be replaced by ether oxygen, or a cyclic alkylene diradical wherein one or more carbons can be replaced by ether oxygen;
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

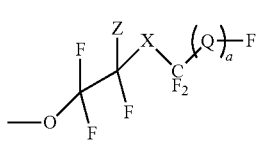

II with the proviso that only one R can be OH or the radical represented by the structure (II);
wherein one or more carbons can be replaced by ether oxygen;

X is O or $CF_2$;
Z is H, Cl, or Br;
a=0 or 1;
and,
Q represents the structure (Ia)

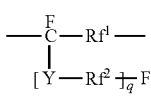

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$.

In an alternative embodiment, the polymer is a copolymer comprising fluoroether functionalized aromatic repeat units represented by the structure (IVa) and fluoroether functionalized aromatic repeat units represented by the structure (IVb). In one embodiment, the copolymer is a random copolymer. In one embodiment, the copolymer is a block copolymer.

In another embodiment the polymer is a copolymer further comprising amide repeat units represented by the structure (V),

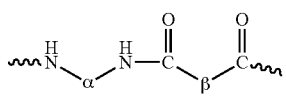

wherein α is a C4-C12 linear alkylene diradical which can be branched or unbranched wherein one or more carbons can be replaced by ether oxygen, or a cyclic alkylene diradical wherein one or more carbons can be replaced by ether oxygen; and, β is a C4-C12 linear alkylene diradical which can be branched or unbranched wherein one or more carbons can be replaced by ether oxygen, a cyclic alkylene diradical wherein one or more carbons can be replaced by ether oxygen, or an aromatic radical.

In another embodiment, the polymer is a copolymer further comprising amide repeat units represented by the structure (VIII)

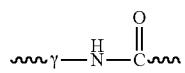

wherein γ is a $C_2$-$C_5$ linear alkylene diradical that can be branched or unbranched wherein one or more carbons can be replaced by ether oxygen, a cyclic alkylene diradical wherein one or more carbons can be replaced by ether oxygen, or an aromatic radical. In a further embodiment, γ is $(CH_2)_5$.

In one embodiment, the copolymer is a random copolymer.

In another aspect, the present invention provides a process comprising combining in a pressure vessel a fluoroether functionalized aromatic diester or diacid with a $C_4$-$C_{12}$ diamine, branched or unbranched, to form a reaction mixture; sealing said pressure vessel; and, heating said reaction mixture in an oxygen reduced atmosphere to a temperature in the range of 225 to 275° C. under autogenous pressure; wherein the fluoroether functionalized aromatic diester or diacid is represented by the structure (III),

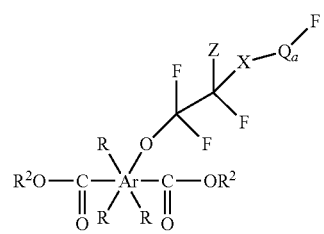

wherein,
Ar represents a benzene or naphthalene radical;
each R is independently H, $C_1$-$C_{10}$ alkyl, $C_5$-$C_{15}$ aryl, $C_6$-$C_{20}$ arylalkyl; OH, or a radical represented by the structure (II)

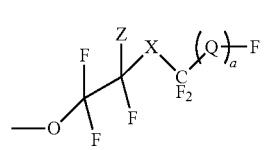

with the proviso that only one R can be OH or the radical represented by the structure (II);
$R^2$ is H or $C_1$-$C_{10}$ alkyl;
X is O or $CF_2$;
Z is H, Cl, or Br;
a=0 or 1;
and,
Q represents the structure (Ia)

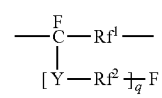

wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$;
and,
wherein the diamine comprises a C4-C12 linear alkylene diradical which can be branched or unbranched wherein one or more carbons can be replaced by ether oxygen, or a cyclic alkylene diradical wherein one or more carbons can be replaced by ether oxygen In one embodiment the diamine is a $C_4$-$C_{12}$ unbranched alkylene diradical.

In one embodiment the diamine is hexamethylene diamine.
In one embodiment of the process, one R is OH.
In one embodiment of the process, each R is H.
In one embodiment of the process, one R is OH and the remaining two Rs are each H.
In one embodiment of the process, one R is represented by the structure (II) and the remaining two Rs are each H.
In one embodiment of the process, $R^2$ is H.

In one embodiment of the process, $R^2$ is methyl.

In one embodiment of the process, X is O. In an alternative embodiment, X is $CF_2$.

In one embodiment of the process, Y is O. In an alternative embodiment, Y is $CF_2$.

In one embodiment of the process Z is Cl or Br. In a further embodiment, Z is Cl. In an alternative embodiment, one R is represented by the structure (II), and one Z is H. In a further embodiment, one R is represented by the structure (II), one Z is H, and one Z is Cl.

In one embodiment of the process, $Rf^1$ is $CF_2$.

In one embodiment of the process, $Rf^2$ is $CF_2$.

In one embodiment of the process, $Rf^2$ is a bond (that is, p=0), and Y is $CF_2$.

In one embodiment, a=0.

In one embodiment, a=1, q=0, and n=0.

In one embodiment of the process, each R is H, Z is Cl, $R^2$ is methyl, X is O, Y is O, $Rf^1$ is $CF_2$, $Rf^2$ is perfluoropropenyl, q=1, and the diamine is hexamethylene diamine.

Suitable diamines include but are not limited to 1,4-diaminobutane, 1,4-diaminocyclohexane, 1,6-diaminohexane, 1,8-diaminooctane, 1,10-diaminodecane, and 1,12-diaminododecane.

While a catalyst is not required to effect the process hereof, a catalyst can be optionally included in the reaction mixture. Suitable catalysts include but are not limited to sodium hypophosphite, phenylphosphinic acid, sodium phenylphosphinate, and phosphoric acid although sometimes no catalyst is used. Other typical nylon polymerization additives can also optionally be included in the reaction mixture. Suitable additives include but are not limited to antioxidants, pigments, and, end group modifiers.

The thus resulting polymer can be separated from the reacted reaction mixture by cooling the vessel and recovering the formed polymer plug.

In one embodiment the reaction mixture comprises more than one embodiment of the repeat units encompassed in structure (I).

In another embodiment, the reaction mixture further comprises a dicarboxlic acid or ester represented by the Structure (VI) . . .

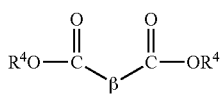

VI wherein β is a C4-C12 linear alkylene diradical which can be branched or unbranched wherein one or more carbons can be replaced by ether oxygen, a cyclic alkylene diradical wherein one or more carbons can be replaced by ether oxygen, or an aromatic radical; and wherein $R^4$ is H or a $C_1$-$C_4$ alkyl group. In a further embodiment, $R^4$ is H and each R is H. In an alternative embodiment, $R^4$ is methyl and each R is H.

In one embodiment, β is an unbranched hexamethylene diradical but could include any other odd or even numbered, branched or non-branched aliphatic diradical.

In an alternative embodiment the reaction mixture further comprises a lactam. In a further embodiment, the reaction mixture further comprises caprolactam.

Suitable fluoroether functionalized aromatic diesters can be prepared by forming a reaction mixture comprising a hydroxy aromatic diester in the presence of a solvent and a catalyst with a perfluoro vinyl compound represented by the structure (VII)

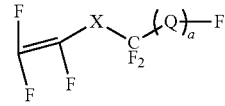

VII wherein X is O or $CF_2$, a=0 or 1; and, Q represents the structure (Ia)

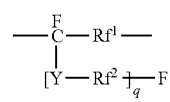

Ia wherein q=0-10;

Y is O or $CF_2$;

$Rf^1$ is $(CF_2)_n$, wherein n is 0-10;

$Rf^2$ is $(CF_2)_p$, wherein p is 0-10, with the proviso that when p is 0, Y is $CF_2$; at a temperature between about −70° C. and the reflux temperature of the reaction mixture.

Preferably the reaction is conducted using agitation at a temperature above room temperature but below the reflux temperature of the reaction mixture. The reaction mixture is cooled following reaction.

When a halogenated solvent is employed, the group indicated as "Z" in the resulting fluorovinyl ether aromatic diester represented by structure (III) is the corresponding halogen. Suitable halogenated solvents include but are not limited to tetrachloromethane, tetrabromomethane, hexachloroethane and hexabromoethane. If the solvent is non-halogenated Z is H. Suitable non-halogenated solvents include but are not limited to tetrahydrofuran (THF), dioxane, and dimethylformamide (DMF).

The reaction is catalyzed by a base. A variety of basic catalysts can be used, i.e., any catalyst that is capable of deprotonating phenol. That is, a suitable catalyst is any catalyst having a pKa greater than that of phenol (9.95, using water at 25° C. as reference). Suitable catalysts include, but are not limited to, sodium methoxide, calcium hydride, sodium metal, potassium methoxide, potassium t-butoxide, potassium carbonate or sodium carbonate. Preferred are potassium t-butoxide, potassium carbonate, or sodium carbonate.

Reaction can be terminated at any desirable point by the addition of acid (such as, but not limited to, 10% HCl). Alternatively, when using solid catalysts, such as the carbonate catalysts, the reaction mixture can be filtered to remove the catalyst, thereby terminating the reaction.

Suitable hydroxy aromatic diesters include, but are not limited to, 1,4-dimethyl-2-hydroxy terephthalate, 1,4-diethyl-2-5-dihydroxy terephthalate, 1,3-dimethyl 4-hydroxyisophthalate, 1,3-dimethyl-5-hydroxy isophthalate, 1,3-dimethyl 2-hydroxyisophthalate, 1,3-dimethyl 2,5-dihydroxyisophthalate, 1,3-dimethyl 2,4-dihydroxyisophthalate, dimethyl 3-hydroxyphthalate, dimethyl 4-hydroxyphthalate, dimethyl 3,4-dihydroxyphthalate, dimethyl 4,5-dihydroxyphthalate, dimethyl 3,6-dihydroxyphthalate, dimethyl 4,8-dihydroxynaphthalene-1,5-dicarboxylate, dimethyl 3,7-dihydroxynaphthalene-1,5-dicarboxylate, dimethyl 2,6-dihydroxynaphthalene-1,5-dicarboxylate, or mixtures thereof.

Suitable perfluorovinyl compounds include, but are not limited to, 1,1,1,2,2,3,3-heptafluoro-3-(1,1,1,2,3,3- hexafluoro-3-(1,2,2-trifluorovinyloxy)propan-2-yloxy)propane, heptafluoropropyltrifluorovinylether, perfluoropent-1-ene, perfluorohex-1-ene, perfluorohept-1-ene, perfluorooct-1-ene, perfluoronon-1-ene, perfluorodec-1-ene, and mixtures thereof.

To prepare a suitable fluoroether functionalized aromatic diester a suitable hydroxy aromatic diester and a suitable perfluovinyl compound are combined in the presence of a suitable solvent and a suitable catalyst until the reaction has achieved the desired degree of conversion. The reaction can be continued until no further product is produced over some preselected time scale. The required reaction time to achieve the desired degree of conversion depends upon the reaction temperature, the chemical reactivity of the specific reaction mixture components, and the degree of mixing applied to the reaction mixture. Progress of the reaction can be monitored using any one of a variety of established analytical methods, including, but not limited to, nuclear magnetic resonance spectroscopy, thin layer chromatography, and gas chromatography.

When the desired level of conversion has been achieved, the reaction mixture is quenched, as described supra. The thus quenched reaction mixture can be concentrated under vacuum, and rinsed with a solvent. Under some circumstances, a plurality of compounds encompassed by the structure (III) can be made in a single reaction mixture. In such cases, separation of the products thus produced can be effected by any method known to the skilled artisan such as, but not limited to, distillation or column chromatography.

If it is desired to employ the corresponding diacid as the monomer instead of the diester, the thus produced fluorovinyl ether functionalized aromatic diester can be contacted with an aqueous base, preferably a strong base such as KOH or NaOH, at a gentle reflux, followed by cooling to room temperature, followed by acidifying the mixture, preferably with a strong acid, such as HCl or $H_2SO_4$, until the pH is between 0 and 2. Preferably pH is 1. The acidification thus performed causes the precipitation of the fluorovinyl ether functionalized aromatic diacid. The thus precipitated diacid can then be isolated via filtration and recrystallization from suitable solvents (e.g., redissolved in a solvent such as ethyl acetate, and then recrystallized). The progress of the reaction can be followed by any convenient method, including but not limited to thin layer chromatography, gas chromatography and NMR.

Once the fluoroether aromatic compound has been prepared, it is suitable for polymerization, among other potential uses.

In a further aspect, the present invention provides a shaped article comprising a polymer comprising a fluoroether functionalized aromatic repeat unit represented by the structure (I)

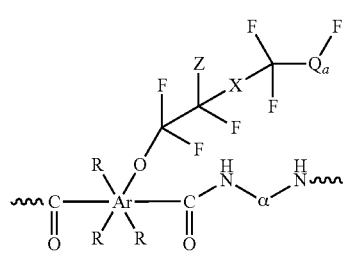

wherein,
α is a C4-C12 linear alkylene diradical which can be branched or unbranched wherein one or more carbons can be replaced by ether oxygen, or a cyclic alkylene diradical wherein one or more carbons can be replaced by ether oxygen;

Ar represents a benzene or naphthalene radical;

each R is independently H, $C_1$-$C_{10}$ alkyl, $C_5$-$C_{15}$ aryl, $C_6$-$C_{20}$ arylalkyl; OH, or a radical represented by the structure (II)

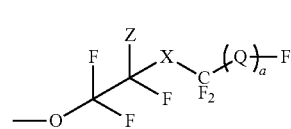

with the proviso that only one R can be OH or the radical represented by the structure (II);

wherein one or more carbons can be replaced by ether oxygen;

X is O or $CF_2$;

Z is H, Cl, or Br;

a=0 or 1;

and,

Q represents the structure (Ia)

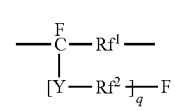

wherein q=0-10;

Y is O or $CF_2$;

$Rf^1$ is $(CF_2)_n$, wherein n is 0-10;

and, $Rf^2$ is $(CF_2)_p$, wherein p is 0-10, with the proviso that when p is 0, Y is $CF_2$.

In one embodiment, the shaped article is a film or sheet.

In another embodiment, the shaped article is a fiber or an article comprising said fiber.

In still another embodiment, the shaped article is a container, such as a bottle, tubing, and other such articles as can be formed in molding operations.

The shaped articles hereof are fabricated from the melt by any process commonly employed in preparing shaped articles of thermoplastic polymers, including but not limited to compression molding, injection molding, screw extrusion, and fiber spinning.

The invention is further described but not limited by the following specific embodiments.

EXAMPLES

The chemicals and reagents were used as received in the Examples as follows:

From Sigma-Aldrich, Milwaukee, Wis:
potassium t-butoxide
tetrahydrofuran (THF)
dichloromethane
hydrochloric acid (HCl)
anhydrous sodium sulfate
dimethyl 5-hydroxyisophthalate
potassium hydroxide (KOH)
caprolactam From SynQuest Labs., Alachua, Fla.:
heptafluoropropyltrifluorovinylether From Invista Intermediates
  adipic acid
  1,6 diamino hexane Examples 1-4

A. Preparation of dimethyl 5-(1,1,2-trifluoro-2-(perfluoropropoxy)ethoxy)isophthalate (F10-iso)

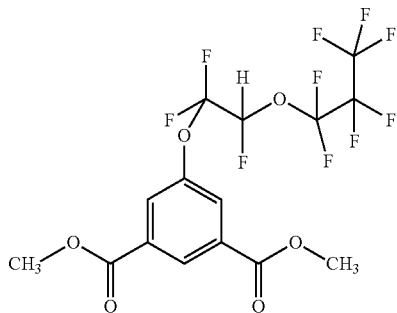 [SMILES: COC(=O)c1cc(OC(F)(F)C(F)OC(F)(F)C(F)(F)C(F)(F)F)cc(C(=O)OC)c1]

In a dry box, dimethyl 5-hydroxyisophthalate (63.0 g, 0.300 mol) was added to an oven-dried multiple neck reaction flask equipped with a stirring bar and a pressure equaling (PE) addition funnel. Tetrahydrofuran (THF, 1500 mL) was then added to the reaction flask, and the reaction mixture was stirred until a homogeneous solution resulted. Potassium t-butoxide (9.24 g, 0.0825 mol) was added to the reaction mixture, resulting in a heterogeneous mixture. Via the PE funnel, heptafluoropropyltrifluorovinyl ether (199.2 g, 0.075 mol) was added to the reaction flask to form a reaction mixture. The reaction mixture was allowed to stir at room temperature for ~24 hours. The reaction was quenched by the addition for 80 mL of 10% HCl to the reaction flask to form a reaction material. The resulting material was concentrated at reduced pressure. The material was then dissolved in dichloromethane (~150 mL) and then washed with 10% HCl (2×100 mL) and then with water (~100 mL) to form an organic phase and an aqueous phase. The separated organic phase was then dried over anhydrous sodium sulfate. The sodium sulfate was then filtered off and the resulting material containing a crude product was concentrated at reduced pressure. The crude product was purified by column chromatography resulting in 100.87 g (70.63%) yield of the desired material, dimethyl 5-(1,1,2-trifluoro-2-(perfluoropropoxy)ethoxy)isophthalate.

B. Preparation of Random Copolyamide

Adipic acid, 1,6-diaminohexane (HMD), carbowax antifoam (5 mg to each tube), dimethyl 5-(1,1,2-trifluoro-2-(perfluoropropoxy)ethoxy)isophthalate (F10-iso), prepared supra were weighed in the amounts shown in Table 1 into 4 tubes that were capped on one end. The tubes were 14 inches long and 1 inch in diameter, and made of stainless steel. HMD was used as a 78 wt % solution in water. Approximately 20 grams of water was added to each tube. Each tube was connected to its own Grove valve (Grove Valve and Regulator Company, Oakland, Calif.) which regulated the pressure in each tube from a common control. The 4 tubes were initially heated to 130° C. at atmospheric pressure with a sand bath to purge air from the tubes with steam after which the release pressure on the Grove valves was increased to 250 psi. The tubes were heated to 250° C. over a period of one hour. When they reached about 220° C. steam began to vent from the tubes through the Grove valves set to vent at 250 psig. When the tubes reached 250° C. controlled pressure reduction was initiated which ramped the pressure from 250 psig to atmospheric over one hour. During pressure reduction the tubes were heated to 275° C. The tubes were heated for an additional 45 minutes at atmospheric pressure and 275° C. before cooling. When the tubes were cool, they were opened and the polymer was removed. The polymer was characterized by Size Exclusion Chromatography (SEC) to determine weight average molecular weight ($M_w$) and Intrinsic Viscosity (IV), by Differential Scanning calorimetry (DSC) to determine the glass transition temperature ($T_g$) and melting point ($T_m$), and by NMR to confirm composition.

Results are shown in Table 2. The column labeled "monomer ratio" in Table 2 refers to the molar ratio of fluorine-containing monomer units to non-fluorine containing monomer units (formed from adipic acid and HMD). Note that the polymer of Example 4 did not exhibit a melting transition.

$^1$H-NMR (DCOOD) δ: 8.35 (ArH), 7.95 (ArH), 7.70 (NH), 6.60 (d, CFH), 3.55 (—$CH_2$—NH—), 3.40 (—$CH_2$—NH—), 2.50 (—$CH_2$—CO—), 1.75 (—$CH_2$—), 1.60 (—$CH_2$—), 1.40 (—$CH_2$—).

TABLE 1

|  | Adipic Acid (g) | HMD (78% in $H_2O$) (g) | F10-iso (g) |
|---|---|---|---|
| Example 1 | 12.65 | 13.78 | 2.17 |
| Example 2 | 10.82 | 12.46 | 3.92 |
| Example 3 | 7.40 | 10.27 | 8.04 |
| Example 4 | 3.89 | 8.13 | 12.67 |

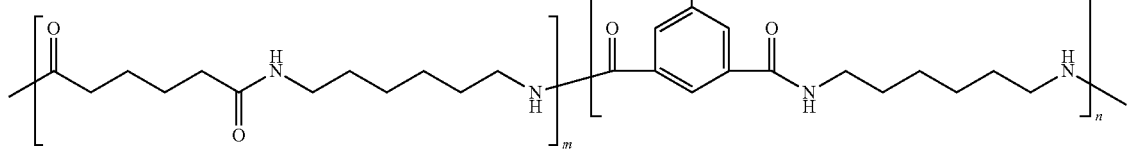

TABLE 2

|  | Monomer Ratio | $M_w$ (D) | $T_g$ (° C.) | $T_m$ (° C.) | IV (dL/g) |
|---|---|---|---|---|---|
| Example 1 | 0.018 | 21,100 | 58.9 | 257.0 | 0.703 |
| Example 2 | 0.048 | 20,600 | 59.1 | 250.6 | 0.587 |
| Example 3 | 0.2 | 36,800 | 58.7 | 198.6 | 0.455 |
| Example 4 | 0.83 | 80,000 | 74.1 | / | 0.456 |

Examples 5-8

A. Preparation of 5-(1,1,2-trifluoro-2-(perfluoropropoxy)ethoxy)isophthalic acid (F10 diacid)

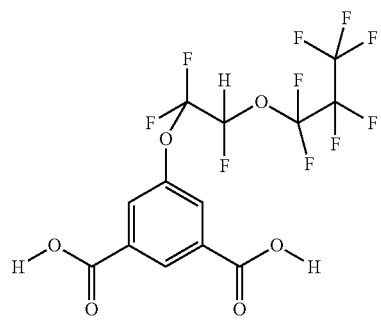 [SMILES: O=C(O)c1cc(OC(F)(F)C(F)OC(F)(F)C(F)(F)C(F)(F)F)cc(C(=O)O)c1]

Dimethyl 5-(1,1,2-trifluoro-2-(perfluoropropoxy)ethoxy) isophthalate (47.6 g, 0.10 mol) was added to a solution of water (1.00 L) and KOH (206 g, 3.5 mol). The resulting solution was heated to reflux for about 48 hours. The reaction was cooled to room temperature and then acidified to a pH of about 1 with concentrated HCl. The precipitate material was filtered and then dried under vacuum for 4 days to give 38.51 g of product.

B. Preparation of Random Copolyamide

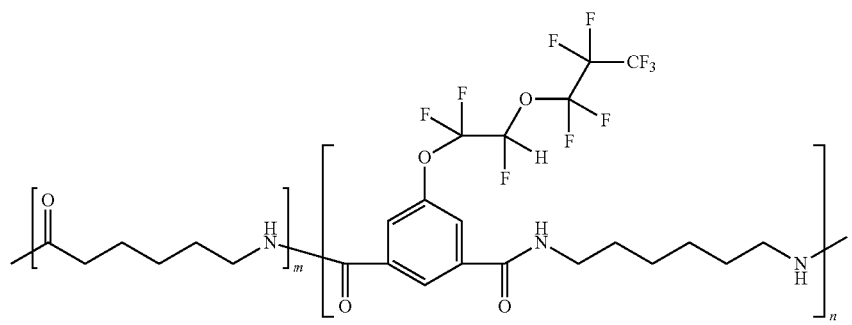

The materials and procedures of Examples 1-4 were employed with the exception that caprolactam was employed in place of adipic acid and 5-(1,1,2-trifluoro-2-(perfluoropropoxy)ethoxy)isophthalic acid was employed in place of dimethyl 5-(1,1,2-trifluoro-2-(perfluoropropoxy)ethoxy)isophthalate.

The amounts of ingredients used are shown in Table 3. Characterization methods were the same as in Examples 1-4. Results are shown in Table 4. The column labeled "monomer ratio" in Table 4 refers to the molar ratio of fluorine-containing monomer units to non-fluorine containing monomer units (formed from caprolactam). Note that the polymers of Examples 7 and 8 did not exhibit a melting transition.

$^1$H-NMR (DCOOD) δ: 8.35 (ArH), 7.95 (ArH), 7.70 (NH), 6.60 (d, CFH), 3.55 (—CH$_2$—NH—), 3.40 (—CH$_2$—NH—), 2.45 (—CH$_2$—CO—), 1.90-1.30 (—CH$_2$—).

TABLE 3

|  | Caprolactam (g) | HMD (78% in H$_2$O) (g) | F10-iso (g) |
|---|---|---|---|
| Example 5 | 17.80 | 0.62 | 1.86 |
| Example 6 | 15.88 | 1.16 | 3.49 |
| Example 7 | 11.25 | 2.57 | 7.42 |
| Example 8 | 6.00 | 4.05 | 11.88 |

TABLE 4

|  | Monomer Ratio | $M_w$ (D) | $T_g$ (° C.) | $T_m$ (° C.) | IV (dL/g) |
|---|---|---|---|---|---|
| Example 5 | 0.024 | 29 900 | 56.8 | 206.6 | 0.794 |
| Example 6 | 0.053 | 37 600 | 57.6 | 186.7 | 0.752 |
| Example 7 | 0.157 | 37 300 | 66.2 | / | 0.585 |
| Example 8 | 0.51 | 75 800 | 83.5 | / | 0.437 |

C. Preparation of Films and Contact Angle Measurements

A Pasadena hydraulic platen press was used to prepare compression molded films. The temperature of the platens was set at 5 C above the melting point of each sample. Melting points were determined using differential scanning calorimetry, wherein the temperature at the peak of the melting endotherm was selected as the melting point.

FIG. 1 depicts the sample preparation configuration as viewed in cross-section. A sample of resin powder, 1, prepared as described supra was placed in a 2"×4"×0.020" mold, 2, formed from 0.020" aluminum shim stock. The shim stock and resin powder were sandwiched between two sheets of fiberglass-reinforced Teflon® sheets, 3, to form a first sandwich. The first sandwich was then placed between two polished brass plates, 4, to form a second sandwich. The second sandwich so formed was placed between the pre-heated platens of a hydraulic press. The press was closed but no pressure was indicated on the pressure gauge. The second sandwich was heated thus for 2 minutes. The press was then opened, and the sample removed after cooling. The dimensions of the resultant film after trimming was about 1"×3"×0.020". The film was then cut into strips ¼"×3".

Static contact angles were recorded on a Rame'-Hart Model 100-25-A goniometer (Rame'-Hart Instrument Co.) with an integrated DROPimage Advanced v2.3 software system. A micro syringe dispensing system was used to dispense 4 microLiters of either water or hexadecane onto the surface of a film specimen as prepared supra. A compression molded film of nylon 6 was used as a control. Results are shown in Table 5. Note that hexadecane was observed to fully wet the nylon 6 control.

TABLE 5

|  | Static water contact angle (°) | Static hexadecane contact angle (°) |
| --- | --- | --- |
| Nylon-6 | 63.9 | <10 |
| Example 5 | 67.1 | 21.8 |
| Example 6 | 75.8 | 27.7 |

Examples 9-11

A. Preparation of Random Copolyamide

TABLE 7

|  | Fluorine final $F_{mol}/CL_{mol}$ | $M_w$ (D) | $T_g$ (° C.) | $T_m$ (° C.) | IV (dL/g) |
| --- | --- | --- | --- | --- | --- |
| Example 9 | 0.051 | 11 300 | 58.4 | 253.5 | 0.448 |
| Example 10 | 0.11 | 50 600 | 60.7 | 246.3 | 0.932 |
| Example 11 | 0.31 | 172 000 | 72.1 | 218.4 | 1.146 |

B. Preparation of films and contact angle measurements from fluorinated polyamides was done as for Example 5 and Example 6. For results see Table 8. In this case a control film was made from Zytel 101 nylon 6,6 available from The DuPont Company

TABLE 8

| Sample name | Static water contact angle (°) | Static hexadecane contact angle (°) |
| --- | --- | --- |
| control | 85 | <10[1] |
| Example 9 | 91.3 | 15.2 |
| Example 10 | 124.5 | 27.2 |

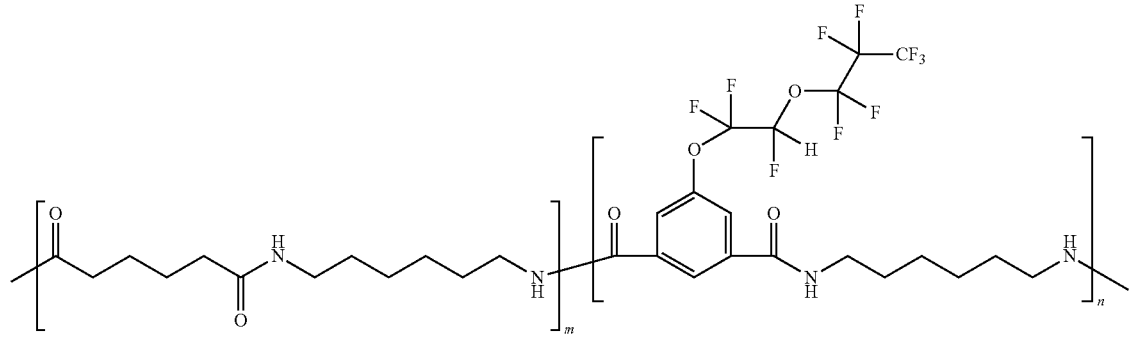

The materials and procedures of Examples 1-4 were employed with the exception that 5-(1,1,2-trifluoro-2-(perfluoropropoxy)ethoxy)isophthalic acid was employed in place of dimethyl 5-(1,1,2-trifluoro-2-(perfluoropropoxy) ethoxy)isophthalate.

The amounts of ingredients used are shown in Table 6. Characterization methods were the same as in Examples 1-4. Results are shown in Table 7.

$^1$H-NMR (DCOOD) δ: 8.35 (ArH), 7.95 (ArH), 7.70 (NH), 6.60 (d, CFH), 3.55 (—CH$_2$—NH—), 3.40 (—CH$_2$—NH—), 2.50 (—CH$_2$—CO—), 1.75 (—CH$_2$—), 1.60 (—CH$_2$—), 1.40 (—CH$_2$—).

TABLE 6

|  | Adipic Acid (g) | HMD (78% in H$_2$O) (g) | F10-iso (g) |
| --- | --- | --- | --- |
| Example 9 | 11.50 | 12.54 | 1.86 |
| Example 10 | 10.26 | 11.82 | 3.49 |
| Example 11 | 6.87 | 9.54 | 7.02 |

What is claimed is:

1. A process comprising combining in a pressure vessel a fluoroether functionalized aromatic diester or diacid and a C$_4$-C$_{12}$ diamine and a catalyst to form a reaction mixture; sealing said pressure vessel, and heating said reaction mixture in an oxygen reduced atmosphere to a temperature of 225 to 275° C. under autogenous pressure; wherein the fluoroether functionalized aromatic diester or diacid is represented by the structure (III),

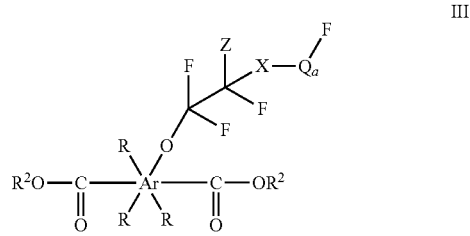

III wherein,

Ar represents a benzene or naphthalene radical;

each R is independently H, C$_1$-C$_{10}$ alkyl, C$_5$-C$_{15}$ aryl, C$_{6-C20}$ arylalkyl; OH, or a radical represented by the structure (II)

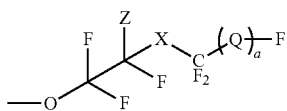

II with the proviso that only one R can be OH or the radical represented by the structure (II);
$R^2$ is H or $C_1$-$C_{10}$ alkyl;
X is O or $CF_2$;
Z is H, Cl, or Br;
a=0 or 1;
and,
Q represents the structure (Ia)

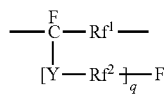

Ia wherein q=0-10;
Y is O or $CF_2$;
$Rf^1$ is $(CF_2)_n$, wherein n is 0-10;
and,
$Rf^2$ is $(CF_2)_p$, wherein p is 0-10, with the proviso that when p is 0, Y is $CF_2$;
and,
wherein the diamine comprises a C4-C12 linear alkylene diradical which can be branched or unbranched wherein one or more carbons can be replaced by ether oxygen, or a cyclic alkylene diradical wherein one or more carbons can be replaced by ether oxygen.

2. The process of claim 1 wherein the diamine is hexamethylene diamine.
3. The process of claim 1 wherein each R is H.
4. The process of claim 1 wherein one R is represented by the structure (II) and the remaining two Rs are each H.
5. The process of claim 1 wherein X is O.
6. The process of claim 1 wherein X is $CF_2$.
7. The process of claim 1 wherein Y is $CF_2$.
8. The process of claim 1 wherein Z is Cl.
9. The process of claim 1 wherein $Rf^1$ is $CF_2$.
10. The process of claim 1 wherein, $Rf^2$ is $CF_2$.
11. The process of claim 1 wherein p=0, and Y is $CF_2$.
12. The process of claim 1 wherein a=0.
13. The process of claim 1 wherein a=1, q=0, and n=0.
14. The process of claim 1 wherein the reaction mixture further comprises a dicarboxylic acid or ester represented by the Structure (VI) . . .

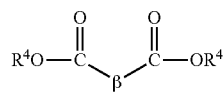

VI wherein β is a C4-C12 linear alkylene diradical which can be branched or unbranched wherein one or more carbons can be replaced by ether oxygen, a cyclic alkylene diradical wherein one or more carbons can be replaced by ether oxygen, or an aromatic radical; and wherein R4 is H or a C1-C4 alkyl group.
15. The process of claim 1 wherein the reaction mixture further comprises a lactam.
16. The process of claim 1, wherein a=1, each R is H, Z is Cl, the diamine is hexamethylene diamine, X is O, Y is O, $Rf^1$ is $CF_2$, $Rf^2$ is perfluoropropenyl, and q=1.

* * * * *